UNITED STATES PATENT OFFICE.

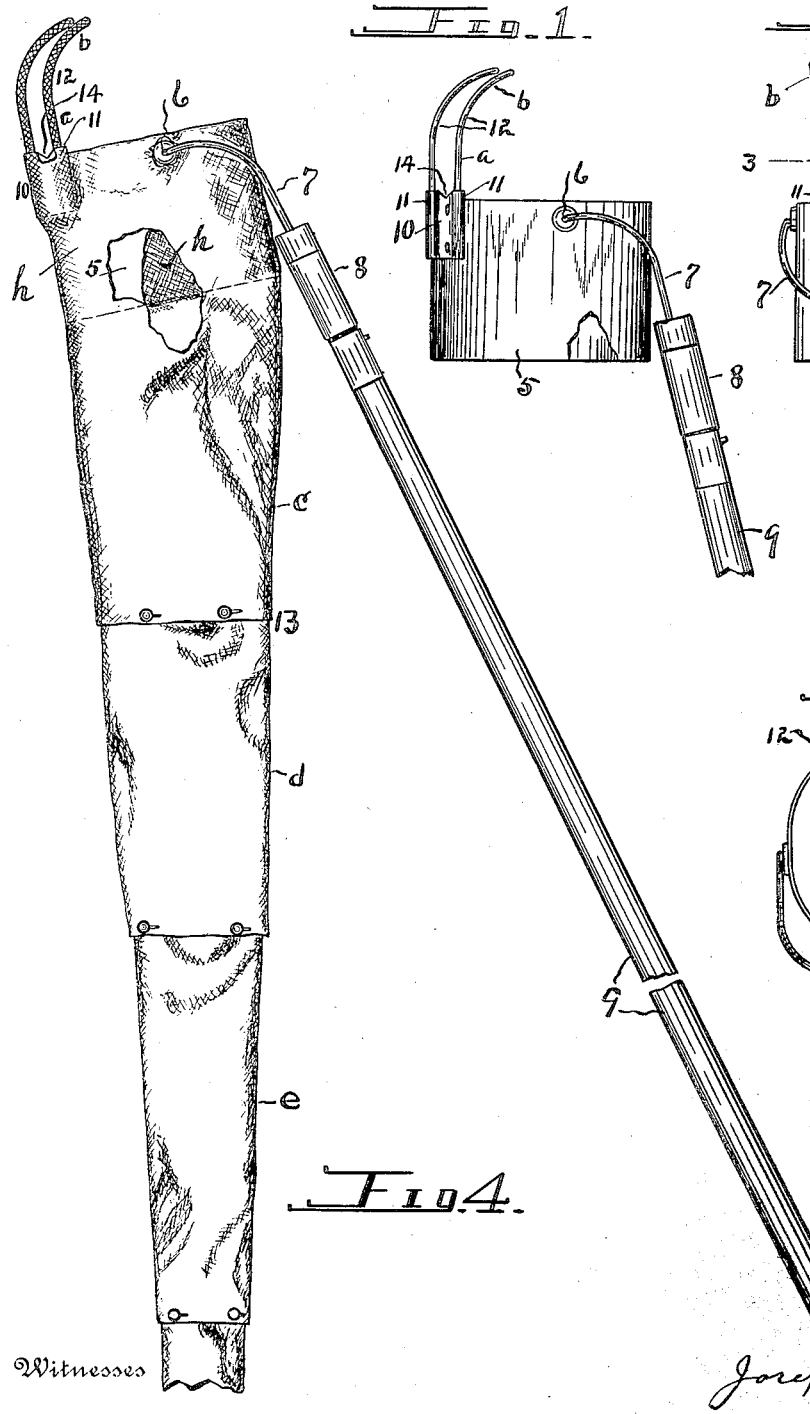

JOSEPH BOLTON, OF JACKSON, NEBRASKA, ASSIGNOR OF ONE-HALF TO JOHN RYAN, OF JACKSON, NEBRASKA.

FRUIT-PICKER.

1,134,099. Specification of Letters Patent. Patented Apr. 6, 1915.

Application filed September 15, 1914. Serial No. 861,754.

*To all whom it may concern:*

Be it known that I, JOSEPH BOLTON, a citizen of the United States, residing at Jackson, in the county of Dakota and State of Nebraska, have invented certain new and useful Improvements in Fruit-Pickers, of which the following is a specification.

This invention relates to an improvement in fruit pickers, and has for its object to provide an article which may be manually used for picking apples, peaches or the like in a manner to prevent injury to the fruit or to the trees, and to dispense with the scaffolds or ladders often employed for gaining access to the upper branches, said device to consist of such parts that it may be economically constructed, and will be convenient in use.

With these objects in view the invention consists of the novel construction, combination and arrangement of parts as described herein and claimed, and as illustrated in the drawing. In the several views of the drawing, the handle is shown broken away.

Figure 1 is a partly broken side view of the device, the fabric for covering the fingers and sleeve, and the flexible carrier-tube being removed. Fig. 2 is a rear view of the parts shown in Fig. 1. Fig. 3 is a plan view of the sleeve, the view being a section on line 3 3 of Fig. 2. Fig. 4 is a partly broken side view of the fruit picker.

Referring now to the drawing for a more particular description, numeral 5 indicates a hollow cylinder or sleeve mounted at 6, near its upper end, upon the bail 7 of the stem or holder-member 8 provided with an extension or handle 9 of any suitable length, the mounting 6 preferably being intermediate the rear side and middle of said sleeve.

Upon the front side of the sleeve and, preferably, disposed at an equal distance from the mountings 6 is suitably secured a sheath 10 provided, at uniform intervals, with substantially parallel pockets or sockets 11 opening on its upper end, for seatings therein of the rectilinear terminal parts *a* of the fingers 12, said fingers projecting upwardly and being curved forwardly near their free ends, so that a part *b* of each finger will overhang the sleeve.

At 13 is indicated an attenuated sack or flexible tube, preferably constructed of canvas, consisting of any suitable number of sections, as indicated at *c*, *d* and *e*, the end of one section being connected to another by any suitable means, but arranged to be disconnected whenever desired, the upper section having a part *h* which covers the outer and inner sides of the sleeve, and preferably, the fingers 12 are also incased in fabric or yielding material to prevent abrasion or injury to the fruit by contacting therewith at the time the fruit is detached from the trees.

In operation, the device may be manually used by a person, who, grasping the handle, may detach the fruit from the trees, the stems being caught between the fingers, the fruit when detached, sliding downward in the tube to the ground or into a suitable receiver or receptacle (not shown).

The handles 9 may have suitable lengths so that the fruit may be reached and removed from the upper or lower branches. By use of the device fruit may be picked rapidly and injury thereof may be prevented since the flexible tube operates as a carrier.

At 14 are indicated inwardly convergent blades formed in the rim of the sheath 10, these being arranged in pairs between the fingers, and tending to cause the stems to be readily severed and tending to prevent peeling of the bark from the twigs or small limbs of the trees, when the stems are engaged between the fingers, during the operation of picking.

In the use of the device a sufficient number of sections should be employed to provide a tube of adequate length, and preferably, each section is formed outwardly-tapered so that the entire tube will be tapered outwardly from the sleeve. When the fruit is picked it will slide downwardly, and its engagement with the sides of the tube will cause it to drag or be detained during the latter part of its descent, to prevent concussion, abrasion or other injury.

It will be understood that the advantage to be derived by the provision of member 8 is that handles 9 of different lengths may be employed.

What I claim as my invention and desire to secure by Letters Patent is,—

In a fruit picker, the combination of a sleeve, curved fingers attached to and projecting upwardly from one of the sides of the sleeve, a chute comprising a flexible, tubular section arranged to cover the inner and outer sides of the sleeve and having a converging part extending outwardly therefrom, a secondary converging, flexible, tubular section detachably connected with said first named section, a bail provided with a holder, a handle detachably connected with the holder, said bail being mounted near the upper edge upon opposed sides of the sleeve adjacent to said fingers to permit swinging movements of the sleeve with reference to said bail and to normally dispose the holder at the side of the sleeve, opposite to said fingers.

In testimony whereof, I have affixed my signature in presence of two witnesses.

JOSEPH BOLTON.

Witnesses:
 H. F. McKeever,
 John Ryan.